Dec. 19, 1922.

E. H. ARMSTRONG.
METHOD OF TREATING ACID PHOSPHATE.
FILED AUG. 6, 1921.

1,439,054.

Inventor
E. H. Armstrong.
By [signature]
Attorney

Dec. 19, 1922.
E. H. ARMSTRONG.
METHOD OF TREATING ACID PHOSPHATE.
FILED AUG. 6, 1921.
1,439,054.
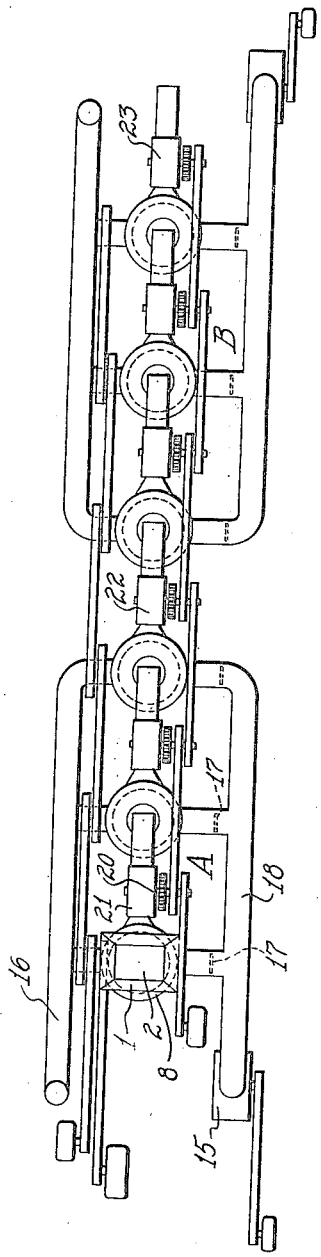
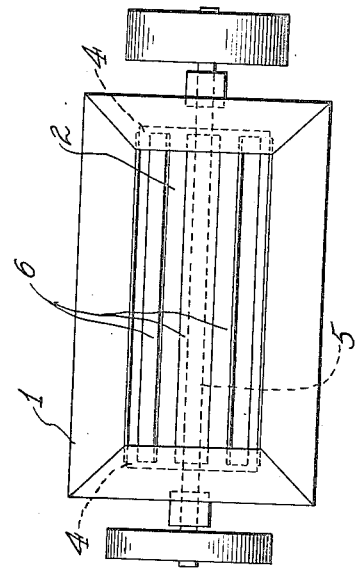
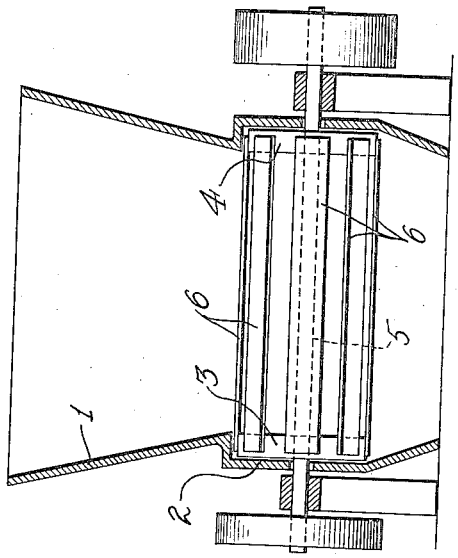
Inventor
E. H. Armstrong.

Patented Dec. 19, 1922.

1,439,054

UNITED STATES PATENT OFFICE.

ELI HENRY ARMSTRONG, OF SAVANNAH, GEORGIA.

METHOD OF TREATING ACID PHOSPHATE.

Application filed August 6, 1921. Serial No. 490,357.

*To all whom it may concern:*

Be it known that I, ELI H. ARMSTRONG, a citizen of the United States, residing at Savannah, in the county of Chatham and State of Georgia, have invented certain new and useful Improvements in Methods of Treating Acid Phosphate, of which the following is a specification, reference being had therein to the accompanying drawing.

This invention primarily relates to an improved method of treating acid phosphate, as well as other similar or analogous materials.

It is an object of the invention to so treat materials, such as a phosphatic mass, that the natural moisture-content, the insoluble phosphoric acid, and the free phosphoric acid will be materially reduced so that, as a consequence, the available phosphoric acid will be considerably increased.

It is a further object of the invention to so treat the material that, as soon as it has been acted on and is "cured," it will be in a comparatively dry condition and be of high-grade character such that it can be immediately stored or shipped without further chemical change thereafter occurring.

It is a still further object of the invention to subject the phosphatic mass to the action of heated air and, as a subsequent step but part of the same operation, to the action of air of relatively different temperature, preferably unheated or cold air.

Other objects and advantages will be apparent from the following description and claims.

I am aware that it has been heretofore proposed to treat phosphatic material by subjecting it to the action of air and, in some instances, to the action of heated air; but I am the first, so far as known to me, successively to treat, by a continuous operation, phosphatic material to the action, first of heated air and, then, to the action of air of relatively different temperature, the heating of the mass effecting a drying action thereon, while the subsequent air-treatment tends to cool it and prevent or arrest further chemical change in or reaction of the mass.

The invention, residing in a method, may be practiced in connection with any preferred form of apparatus, one type of which is shown in the accompanying drawings; but it is to be understood that these drawings are merely illustrative and that other types of apparatus may be employed.

In these drawings:

Fig. 2 is a view in top plan thereof; and

Figs. 3 and 4 are views, respectively, in section and plan of the hopper and associated cutting mechanism for treating material preparatory to passing through the remainder of the apparatus.

Figure 1:
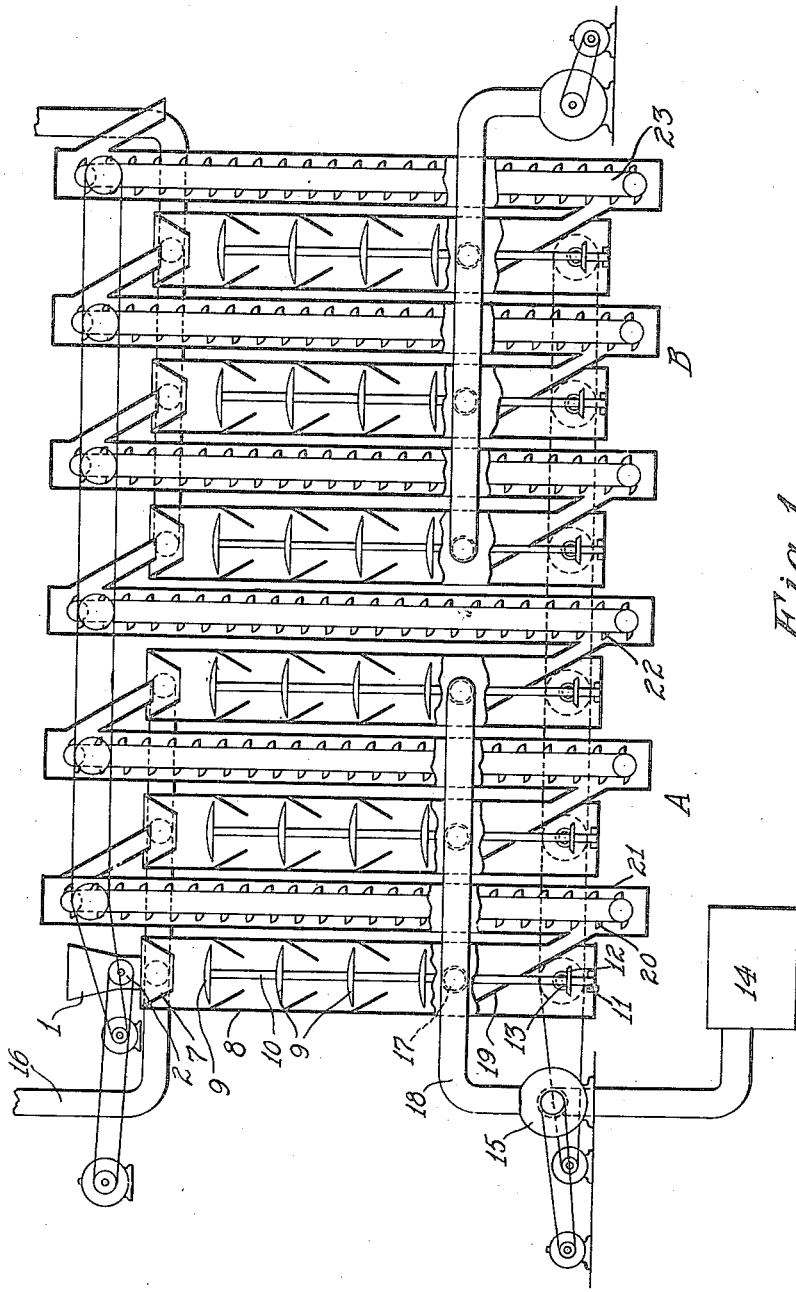
Figure 1 is a view in sectional elevation, more or less diagrammatic, of apparatus constructed for practicing my invention.

Referring to these drawings, the reference-character A designates the group of units of the apparatus for carrying out the first step in my method, while the reference-character B designates the group of units of the apparatus for carrying out the second step; but it will be understood that the operation is a continuous one, and that there is no interruption in the treatment of the material when passing from the group A to the group B.

In carrying out the first step, the phosphate, from any style of den, is introduced through a hopper 1 into a cutting or shaving machine 2 conveniently located near the top of one of the vertically-disposed conduits, towers, or columns forming a part of the apparatus. This cutting machine preferably consists of two metal disks 3 and 4, fastened to a centrally-disposed shaft 5. Secured to the circumference of the disks 3 and 4 are knives 6 for cutting or shaving the phosphate-mass as the same passes through the cutting machine, so that the same will be rendered of sufficient size to pass through the several towers of the series, hereinafter to be referred to.

After the phosphate-mass has been thus thoroughly chopped or shaved, it passes through a mass-spreading member 7, which preferably and as shown is cone or funnel-shaped, the upper or entrance end of which is attached to the sides of the conduit or tower and the lower or discharging end being preferably of a size considerably smaller than the entrance or top thereof, the cone tapering in size until the discharge end is of such reduced diameter. The material then passes into the first tower 8, and into the uppermost conical member 7 thereof, through the restricted outlet and is deposited onto a revolving mass-spreading member, centrifugal, or disk 9, preferably arc-shaped and curved on its upper surface so that the material falling thereon will, by centrifugal action developed by the rotating member 9, tend to move towards the edges of the disk and against the walls of the tower. This disk is secured to a vertically-disposed shaft 10, and is adapted to revolve at such speed that centrifugal force will throw the phosphate-mass outwardly, whereupon it will fall into the cone-member immediately subjacent thereto and, thence, through its restricted discharge-outlet onto the revolving disk thereunder, and so on down through the tower. Preferably and as shown, the revolving disks 9 are of a size somewhat smaller in circumference than the entrance end of the cone-shaped members so that the phosphatic mass drops by gravity from the reduced end of the cone members onto the disks at about their central portion.

Means are provided for supporting and driving the rotating shaft 10, and in this instance I have provided bearings 11, a pinion 12, and a gear 13 for this purpose. It is to be understood that the speed of rotation of the shaft and the disks carried thereby can be controlled and regulated in any well known manner so that the material falling onto the disks will be thrown by the centrifugal force against the side of the tower and, thence, by gravity, into the subjacent cone member. By means of the centrifugals 9, the phosphatic mass is centrifuged and, thus, more or less separated for more efficient action of an air-treatment, presently to be described.

In the present instance, I have shown each tower as provided with a set or series of cone-shaped members and mass-spreading members; but it is to be understood that the number of these more or less determines the capacity of the apparatus, and the same can be increased or diminished as experience in the operation of the apparatus may demonstrate.

In order that the phosphatic mass may be subjected to the action of a drying medium while it is traveling through the towers, I have provided means for subjecting the material to the action of a current or blast of air, preferably heated by a furnace 14 to a degree sufficient to accomplish the desired results. The furnace is preferably located at one side of the apparatus and the heated air is forced by fans or blowers 15 located between the furnace and the first tower of the series, entering the towers at the lowermost portion thereof and passing in an upward direction through the downwardly traveling mass and escaping through a flue 16 at the side of the towers either directly into the atmosphere or into a room or chamber (not shown) that will act as a dust-collector. By thus subjecting the downwardly traveling phosphatic mass to the action of the upwardly traveling current of heated air, there is such a thorough intermingling of the air with the material that, in actual practice, I have been able to reduce the initial or natural moisture content of the mass from approximately fourteen (14) to eight (8) per cent and less, and to reduce the insoluble phosphoric acid from approximately one-half ($\frac{1}{2}$) to one (1) per cent, with a consequent reduction in the free phosphoric acid of from between three (3) to five (5) per cent, and with an increase in the available phosphoric acid of from one and one-half ($1\frac{1}{2}$) to two (2) per cent.

As previously pointed out, the temperature of the air can be regulated to effect the desired results, and experience will demonstrate to the operator just the amount needed for each grade or batch of material being treated. I have also made provision for regulating the volume of the blast of air entering the towers, and in this connection I have shown dampers 17 disposed in pipe 18 leading from the blower 15.

After the material has been thrown from the lowermost rotating centrifugal in the tower, it falls upon an inclined chute 19 at the bottom of the tower and then onto an elevator or conveyor 20 mounted in a housing 21, by which it is carried upwardly to the top of the adjoining tower, whereupon it is therein subjected to the same treatment and action as in the first-mentioned tower. It will thus be seen that the steps of the method are carried out in a continuous manner, in that the material is passed from one tower to its adjoining tower without interruption in the operation and treatment of the mass.

The first step in the method is completed when the phosphatic mass has traveled through group A of the series of towers and has therein been subjected to the action of the upwardly traveling current of heated air.

To carry out the second step in the practice of my method, the material, after it leaves the last tower in which it was subjected to the heated air, is carried by the elevator 22 juxtaposed to said last tower to the first of group B of towers wherein the mass is subjected to the same treatment as when passing through the A-series of towers, including the cone-shaped members and rotating disk-members, in the first step, except that it is subjected to the action of an upwardly traveling current of air of relatively different temperature from that used in the first step of the method. Preferably, the air used in the second step is unheated or cold, or at least of such a temperature that it will arrest and prevent any further chemical action or reaction after the acid phosphate has been cured and delivered to the storage house or placed in bags for shipment. After subjecting the continuously moving mass during the second step to the action of cool or cold air to prevent chemical changes in the material, as aforementioned, the phosphatic mass may be delivered to an elevator 23 and thereby passed through any suitable screening machine (not shown). After the material has been thus screened, it is then conveyed to the storage-house or may be immediately bagged for shipment.

While I have described the invention as particularly adapted to the treatment of phosphatic materials; nevertheless, it will be understood that the same is not to be restricted thereto, being adapted to the treatment of any mass or material where it is desired to subject a downwardly traveling mass to a centrifuging action and to the action, first, of a drying medium of predetermined temperature and, then, to the action of a cooling medium of relatively different temperature.

It is to be understood that the two steps or stages of the procedure may be practiced by a single group of towers or columns by cutting off the supply of hot air introduced thereto to effect the aforementioned drying action on the mass, and introducing, into the same columns, a body of air of relatively different temperature to cool the same and to arrest chemical change and reaction in the mass, as aforementioned. It will also be understood that, for the treatment of some materials, the successive subjection thereof to the action of air of different temperatures may be reversed, the cooling air being first directed into the gravitating mass, whereupon the second stage of subjecting the mass to the action of a body of heated air may be utilized.

It is an important feature of my method to move the mass of phosphatic or other material in one direction and to pass, as a countercurrent, bodies of air—first heated and then unheated—therethrough whereby the material is first dried and, then, cooled, for reasons hereinabove specified. Thus, it will be seen that instead of employing vertical columns or towers, the same results, may be accomplished by employment of conduits, similar to the towers, occupying horizontal or inclined positions, the movement of the phosphatic mass being accomplished in any suitable way and against a countercurrent of heated and unheated air, successively. By reason of the peculiar nature of phosphatic masses, however, the desirable way of handling the same is from an altitudinous position downwardly and against a countercurrent of uprising hot air and unheated air, successively.

What I claim as new and desire to secure by Letters Patent is:

1. The herein described method of treating acid phosphate and the like which consists in putting the phosphatic mass in motion and then directing therethrough, first, a body of heated air to dry the mass and, then, as a successive step, passing therethrough a body of unheated air to cool the same and arrest subsequent chemical action or reaction in the mass.

2. The herein described method of treating acid phosphate and the like which consists in putting the phosphatic mass in motion and then directing therethrough, first, a body of heated air to dry the mass and, then, as a successive step, passing therethrough a body of unheated air to cool the same and arrest subsequent chemical action or reaction in the mass, the material being centrifuged to facilitate the action of the bodies of air passed therethrough.

3. The herein described method of curing acid phosphate and the like which consists in moving the phosphatic mass in a relatively downward direction and subjecting the same to the action of a rising body of heated air and, as a successive step, moving the air-heated mass in a relatively downward direction and subjecting the same while moving to the action of a body of unheated air, the mass, during its downward movements, being subjected to a centrifugal action.

4. The herein described method of curing acid phosphate and the like which consists in moving the phosphatic mass in a relatively downward direction and subjecting the same to the action of a body of heated air and, as a successive step, moving the air-heated mass in a relatively downward direction and subjecting the same while moving to the action of a body of unheated air.

5. The process of curing acid phosphate and the like which consists in treating the phosphatic mass to the action of air of relatively warm temperature and, thereafter, to the action of unheated air.

6. The process of curing acid phosphate and the like which consists in centrifuging the phosphatic mass, simultaneously treating the same to a body of heated air, and successively subjecting the mass to the cooling action of a body of unheated air.

7. The process of curing acid phosphate and the like which consists in treating the phosphatic mass to the action of a blast of upwardly traveling air of relatively warm temperature and, thereafter, to the action of relatively cool air.

8. The process of curing acid phosphate and the like which consists in treating, in a continuous operation, the phosphatic mass to the action of air of relatively warm temperature and, thereafter, to the action of relatively cool air.

9. The process of curing acid phosphate and the like which consists in treating, in a continuous operation, the phosphatic mass to the action of a blast of upwardly traveling air of relatively warm temperature and, thereafter, to the action of a blast of upwardly traveling air of relatively cool temperature.

10. The herein described method of curing acid phosphate and the like which consists in passing the same through a series of towers and simultaneously effecting a movement of the mass as it descends in the towers and subjecting the mass to the action of a body of heated air and, as a successive step, passing the air-heated mass through a second series of towers and simultaneously moving the mass and subjecting the same to the action of a body of unheated air as the mass descends in the towers.

11. The herein described method of curing acid phosphate and the like which consists in passing the same through a series of towers and simultaneously effecting, by centrifugal action, a movement of the mass as it descends in the towers and subjecting the mass to the action of a body of heated air and, as a successive step, passing the air-heated mass through a second series of towers and simultaneously moving the mass and subjecting the same to the action of a body of unheated air as the mass descends in the towers.

12. The herein described method of curing acid phosphate and the like which consists in passing the same through a series of towers and simultaneously effecting a movement of the mass as it descends in the towers and subjecting the mass to the action of a body of heated air passing upwardly through the mass as the same descends in the towers and, as a successive step, passing the air-heated mass through a second series of towers and simultaneously moving the mass by centrifugal action while descending in the towers and at the same time subjecting the same to the action of a body of unheated air passing upwardly through the mass as the same descends in the towers.

13. A method of curing acid phosphate consisting of moving a phosphatic mass from an altitude, simultaneously moving the mass first in the presence of a body of heated air and then, successively, to the action of a body of unheated air.

14. A method of curing acid phosphate consisting of moving a phosphatic mass from an altitude, simultaneously moving the mass first in the presence of a body of heated air and then, successively, to the action of a body of unheated air.

In testimony whereof I affix my signature in presence of two witnesses.

ELI HENRY ARMSTRONG.

Witnesses:
P. N. HOLST,
F. H. WATTERS.